US010785179B2

(12) United States Patent
DeLuca et al.

(10) Patent No.: US 10,785,179 B2
(45) Date of Patent: Sep. 22, 2020

(54) ALERT MODIFICATION BASED ON CONTENT OF A NOTIFICATION

(71) Applicant: International Business Machines Corporation, Armonk, NY (US)

(72) Inventors: Lisa Seacat DeLuca, Baltimore, MD (US); Jeremy A. Greenberger, San Jose, CA (US); Zachary M. Greenberger, Raleigh, NC (US)

(73) Assignee: International Business Machines Corporation, Armonk, NY (US)

(*) Notice: Subject to any disclaimer, the term of this patent is extended or adjusted under 35 U.S.C. 154(b) by 105 days.

(21) Appl. No.: 15/708,334

(22) Filed: Sep. 19, 2017

(65) Prior Publication Data

US 2019/0089668 A1 Mar. 21, 2019

(51) Int. Cl.
| H04L 12/58 | (2006.01) |
| H04L 29/08 | (2006.01) |
| H04W 4/80 | (2018.01) |
| H04W 4/021 | (2018.01) |
| H04L 12/18 | (2006.01) |
| H04W 4/23 | (2018.01) |

(52) U.S. Cl.
CPC .......... *H04L 51/26* (2013.01); *H04L 12/1895* (2013.01); *H04L 51/12* (2013.01); *H04L 51/24* (2013.01); *H04L 67/26* (2013.01); *H04W 4/021* (2013.01); *H04W 4/23* (2018.02); *H04W 4/80* (2018.02)

(58) Field of Classification Search
CPC ......... H04L 51/26; H04L 51/12; H04L 51/24; H04L 67/26; H04L 12/1895; H04W 4/80
See application file for complete search history.

(56) References Cited

U.S. PATENT DOCUMENTS

| 6,249,668 B1 | 6/2001 | Abe et al. |
| 6,973,336 B2 | 12/2005 | Heie |
| 8,823,507 B1 | 9/2014 | Touloumtzis |
| 9,319,473 B2 | 4/2016 | Zadorozny et al. |
| 9,349,263 B2 | 5/2016 | Kiefer et al. |
| 9,413,838 B1 | 8/2016 | Ovsiankin et al. |
| 9,467,970 B1 | 10/2016 | Kim et al. |

(Continued)

OTHER PUBLICATIONS

Parameswaran Thrissur Krishnamoorthy; Ttl: Method and System for Suggesting Activities for a Location Based on a User's Social Network; Jun. 8, 2015; Database: ip.com; ip.com No. IPCOM000241907D.

(Continued)

*Primary Examiner* — Nam T Tran
(74) *Attorney, Agent, or Firm* — Schmeiser, Olsen & Watts, LLP; Stephanie Carusillo

(57) ABSTRACT

An alert system and method may include receiving a notification message from a notification device, in an environment with one or more notification devices arranged throughout the environment, analyzing the notification message to determine a class of notification message, the class of notification message being input by a user prior receiving the notification message, determining an alert preference corresponding to the class of notification message, the alert preference being input by the user prior to receiving the notification message, and alerting, by the processor, the user of the notification message in accordance with the alert preference.

14 Claims, 8 Drawing Sheets

(56) References Cited

U.S. PATENT DOCUMENTS

| | | | |
|---|---|---|---|
| 9,479,387 B2 * | 10/2016 | Arabo | H04L 67/26 |
| 9,563,627 B1 | 2/2017 | Wheeler et al. | |
| 9,564,040 B1 | 2/2017 | Charlton | |
| 2006/0116142 A1 * | 6/2006 | Cofta | H04L 51/24 |
| | | | 455/466 |
| 2010/0180001 A1 | 7/2010 | Hardt | |
| 2012/0011242 A1 | 1/2012 | Suchter et al. | |
| 2013/0137464 A1 | 5/2013 | Kramer et al. | |
| 2014/0095617 A1 | 4/2014 | Chan et al. | |
| 2014/0129661 A1 | 5/2014 | Thyagaraja | |
| 2015/0105060 A1 | 4/2015 | An | |
| 2015/0140982 A1 | 5/2015 | Postrel | |
| 2015/0248702 A1 * | 9/2015 | Chatterton | H04W 4/80 |
| | | | 705/14.58 |
| 2016/0119771 A1 | 4/2016 | Moldavsky et al. | |
| 2016/0343009 A1 | 11/2016 | Ovsiankin et al. | |
| 2018/0152410 A1 * | 5/2018 | Jackson | H04L 51/24 |

OTHER PUBLICATIONS

Office Action (dated Jun. 14, 2018) for U.S. Appl. No. 15/828,519, filed Dec. 1, 2017.
Amendment (dated Sep. 13, 2018) for U.S. Appl. No. 15/828,519, filed Dec. 1, 2017.
Final Office Action (dated Nov. 13, 2018) for U.S. Appl. No. 15/828,519, filed Dec. 1, 2017.
Final amendment (dated Jan. 14, 2019) for U.S. Appl. No. 15/828,519, filed Dec. 1, 2017.
Notice of Allowance (dated Feb. 6, 2019) for U.S. Appl. No. 15/828,519, filed Dec. 1, 2017.
Patent application for U.S. Appl. No. 16/404,874, filed May 7, 2019.

\* cited by examiner

US 10,785,179 B2

ALERT MODIFICATION BASED ON CONTENT OF A NOTIFICATION

TECHNICAL FIELD

The present invention relates to systems and methods for alert modification, and more specifically embodiments of an alert system for alerting a user based on the content of a notification.

BACKGROUND

Bluetooth low energy (BLE) beacons provide an enhanced experience for customers of venues, such as stadiums, airports, retail stores, shopping malls, and hospitals. The beacons can be used for a wide range of uses, from sales promotions to building security.

SUMMARY

An embodiment of the present invention relates to a method, and associated computer system and computer program product, for modifying an alert based on the content of a notification. A processor of a computing system receives a notification. The notification message is analyzed to determine a class of notification message, the class of notification message being input by a user prior to receiving the notification message. An alert preference is determined corresponding to the class of notification message, the alert preference being input by the user prior to receiving the notification message. The user is alerted of the notification message in accordance with the alert preference.

DETAILED DESCRIPTION

One or more beacon devices, such as a BLE beacon may be arranged throughout an environment or venue, such as a retail store, airport, shopping mall, stadium, concert, festival, hospital, and the like. When a user mobile device comes within a certain proximity of the beacon device, the user's mobile device may receive and process a signal from the beacon, which can result in receiving a notification message for the user to view on the user's mobile device. Particularly for promotional alerts, a user mobile device can become inundated with offers and promotions from various sources.

Thus, there is a need for an alert system for allowing a user to set up a type of alert the user would like to receive based on the content of the notification. The alert system described herein may analyze push notifications and provide the user with a proper alert according to the user's preferences.

Figure 1:
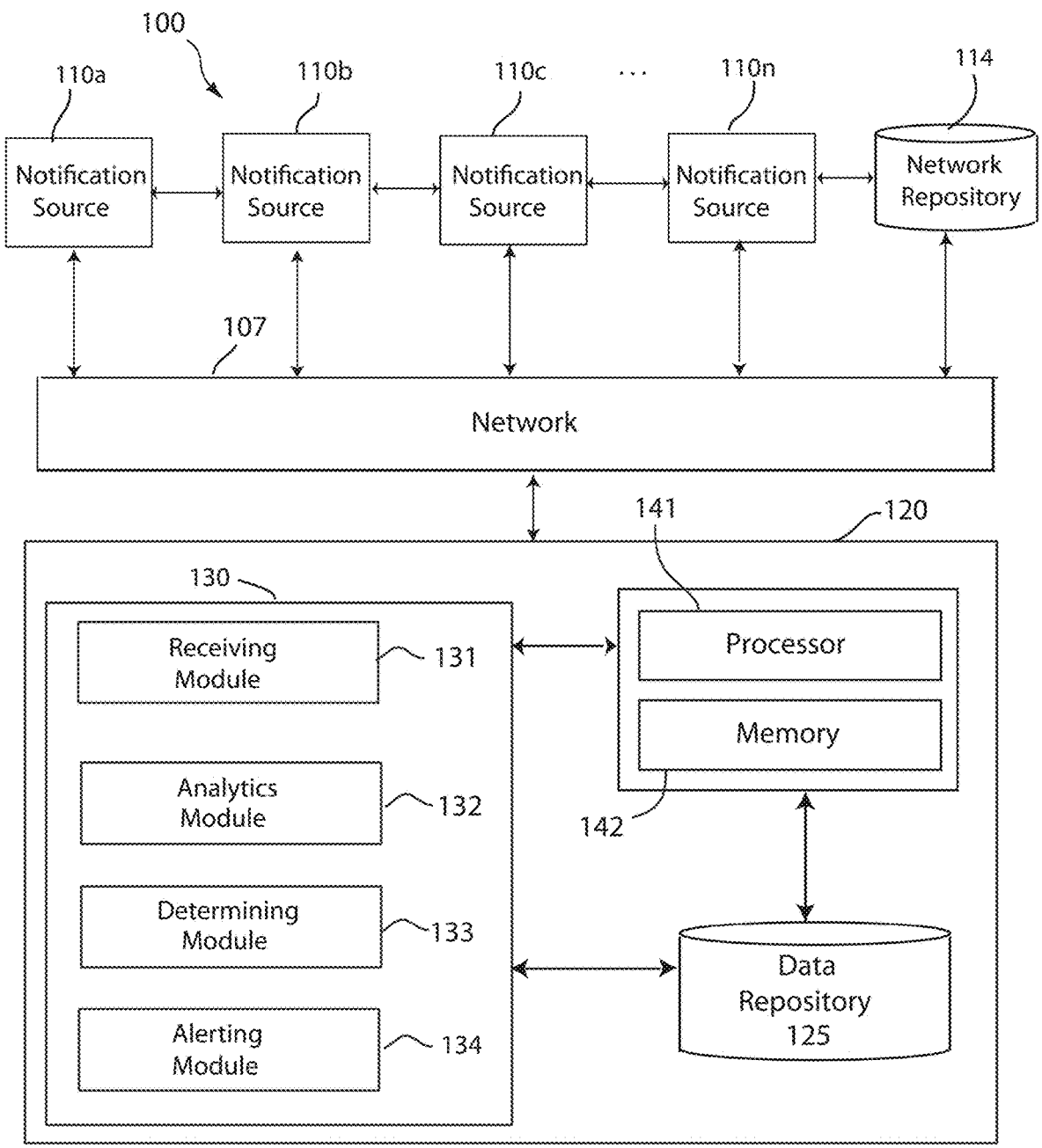
FIG. 1 depicts a block diagram of an alert system, in accordance with embodiments of the present invention.

Referring to the drawings, FIG. 1 depicts a block diagram of alert system 100, in accordance with embodiments of the present invention. Embodiments of the alert system 100 may be a system for determining an alert preference of the user based on a content of a push notification or other notification message. Embodiments of the alert system 100 may be useful for users who prefer to only receive certain push notification while attending a venue, or users that prefer to customize push notification alerts based on a type of notification message. Notification messages may be signals, communications, transmissions, messages, push notifications, data, notification and the like, that contain text, received by a user mobile device from one or more beacon devices arranged in an environment of venue. Embodiments of the environment may be a venue, a location, a city, a neighborhood, a district, a shopping center, a warehouse, a building, a school, a campus, a hospital, a base camp, a shopping mall, a retail store, a market, an airport, a train station, a stadium, and the like.

Embodiments of the alert system 100 may be an alert modification system, a notification content analysis system, an alert customization system, a notification system, and the like. Embodiments of the alert system 100 may include a computing system 120. Embodiments of the computing system 120 may be a computer system, a computer, a cellular phone, a user mobile device, a user computing device, a tablet computer, a smart watch, a wearable computing device, such as smart eyeglasses, a dedicated mobile device, a laptop computer, other internet accessible device or hardware and the like. Embodiments of the computing system 120 may include hardware functionality such as a speaker for emitting a sound, a vibration motor for creating vibrations, a display for displaying the notification message, with the ability to flash the display or portions of the content being displayed, a light emitting element for emitting a light, a receiver for receiving communications, a transmitter for transmitting signals, and other similar features and hardware of a smartphone, smartwatch, cell phone, tablet computer, and the like.

Furthermore, embodiments of alert system 100 may one or more notification sources 110a, 110b, 110c . . . 110n, which are devices (for example, beacon devices) that are communicatively coupled to a computing system 120 of the alert system 100 over a computer network 107. For instance, information/data may be transmitted to and/or received from one or more notification sources 110a, 110b, 110c . . . 110n over a network 107. A computer network 107 may be the cloud. Further embodiments of computer network 107 may refer to a group of two or more computer systems linked together. Computer network 107 may be any type of computer network known by individuals skilled in the art. Examples of computer network 107 may include a LAN, WAN, campus area networks (CAN), home area networks (HAN), metropolitan area networks (MAN), an enterprise network, cloud computing network (either physical or virtual) e.g. the Internet, a cellular communication network such as GSM or CDMA network or a mobile communications data network. The architecture of the computer network 107 may be a peer-to-peer network in some embodiments, wherein in other embodiments, the computer network 107 may be organized as a client/server architecture.

In some embodiments, the computer network 107 may further comprise, in addition to the computing system 120, a connection to one or more network-accessible knowledge bases 114, which are network repositories containing information of the user, product information, promotional information, location information, user activity, user preferences, network repositories or other systems connected to the computer network 107 that may be considered nodes of the computer network 107. In some embodiments, where the computing system 120 or network repositories allocate resources to be used by the other nodes of the computer network 107, the computing system 120 and network-accessible knowledge bases 114 may be referred to as servers.

The network-accessible knowledge bases 114 may be a data collection area on the computer network 107 which may back up and save all the data transmitted back and forth between the nodes of the computer network 107. For example, the network repository may be a data center saving and cataloging user activity data, user data, location data, user preference data, and the like, to generate both historical and predictive reports regarding a particular user or a user's message preference, and the like. In some embodiments, a data collection center housing the network-accessible knowledge bases 114 may include an analytic module capable of analyzing each piece of data being stored by the network-accessible knowledge bases 114. Further, the computing system 120 may be integrated with or as a part of the data collection center housing the network-accessible knowledge bases 114. In some alternative embodiments, the network-accessible knowledge bases 114 may be a local repository that is connected to the computing system 120.

Embodiments of the one or more notification sources 110a, 110b, 110c . . . 110n may be a beacon, a beacon device, RF device, hardware transmitter, a BLE device, a transmitter, an emitting device, and the like, which may broadcast a universally unique identifier for receiving by a user mobile device. The one or more notification sources 110a, 110b, 110c . . . 110n may be used for mobile marketing in an environment, broadcasting promotional push notifications to the user mobile devices when the user mobile device is at a particular location or point-of-interest. The one or more notification sources 110a, 110b, 110c . . . 110n may be interconnected over a network, or may be independent and separate from the other beacons or notification sources in a same venue or environment.

Furthermore, embodiments of the computing system 120 may be equipped with a memory device 142 which may store various data/information/code, and a processor 141 for implementing the tasks associated with the alert system 100. In some embodiments, an alert modification application 130 may be loaded in the memory device 142 of the computing system 120. The computing system 120 may further include an operating system, which can be a computer program for controlling an operation of the computing system 120, wherein applications loaded onto the computing system 120 may run on top of the operating system to provide various functions. Furthermore, embodiments of computing system 120 may include the alert modification application 130. Embodiments of the alert modification application 130 may be an interface, an application, a program, a module, or a combination of modules. In an exemplary embodiment, the alert modification application 130 may be a software application running on one or more back end servers, servicing a user mobile device, or may be a software application running on the user mobile device.

The alert modification application 130 of the computing system 120 may include a receiving module 131, an analytics module 132, a determining module 133, and an alerting module 134. A "module" may refer to a hardware-based module, software-based module or a module may be a combination of hardware and software. Embodiments of hardware-based modules may include self-contained components such as chipsets, specialized circuitry and one or more memory devices, while a software-based module may be part of a program code or linked to the program code containing specific programmed instructions, which may be loaded in the memory device of the computing system 120. A module (whether hardware, software, or a combination thereof) may be designed to implement or execute one or more particular functions or routines.

Embodiments of the receiving module 131 may include one or more components of hardware and/or software program code for receiving a notification message from notification sources 110a, 110b, 110c . . . 110n, in an environment with one or more notification sources 110a, 110b, 110c . . . 110n arranged throughout the environment. For instance, embodiments of the receiving module 131 may receive a transmission from a beacon arranged in an environment when a user reaches a particular physical location within the venue or at a given time from the closest notification source when the notification sources 110a, 110b, 110c . . . 110n are broadcasting/transmitting a similar signal. In an exemplary embodiment, the receiving module 131 may receive and/or process the signal received by the receiver hardware of the user mobile device, for further analysis by the alert modification application 130.

Referring still to FIG. 1, embodiments of the computing system 120 may further include an analytics module 132. Embodiments of the analytics module 132 may include one or more components of hardware and/or software program code for analyzing the notification message to determine a class of notification message. For instance, embodiments of the analytics module 132 may, in response to receiving the notification message from a beacon or other notification transmitting device, analyze the content of the notification message to determine a class of the notification message was received from the beacon. The content of the notification message may be analyzed by a text analysis system that may parse, identify, etc. words using, for example, a natural language processing technique, to analyze the content payload of the notification message. In response to analyzing the content payload of the notification message received from the beacon or other notification source, the analytics module 132 may analyze the content to determine whether the content of the notification matches a class of notification, as pre-selected by the user or as a default selected. For example, a class of notification message may be a particular type of message, such as rich text, simple text, video, image, etc., or category of message, such as a category of promotional notification messages, time-sensitive messages, location based offers, etc. Embodiments of a category of promotional messages may be notifications that offer a promotion, such as a sale promotion, marketing information, and the like, which intends to drive users to that part of the venue, or to purchase a particular item, etc. Some examples of a promotional notification message may include a generic welcome message, an indication of a last time the user has visited a location, at least a first percentage off of a sale price (e.g. at least 5%-15%), at least a second percentage off of the sale price (e.g. at least 16%-40%), at least a third percentage off of the sale price (e.g. greater than 40%), a time dependent offer (e.g. today only or for the next X amount of time), an offer related to a particular good or service (e.g. golf accessories), an offer referring to limited supply items, and the like. Various percentages may be used to categorize a type of message as well as various amount of time for urgent notifications or time dependent notifications, and product specific notifications.

Accordingly, embodiments of the analytics module 132 may analyze the content payload (e.g. text) of the notification message to determine what class (e.g. type and/or category) of notification message is being received by the receiving module 131. The classes of messages may be input or pre-selected by a user (e.g. via GUI of alert modification application 130) prior to receiving the notification message from the notification source 110a. For example, the user may interact with the user mobile device GUI of alert modification application 130 to enter which classes of notifications the user would prefer to receive or have filtered by alert modification application 130 as the notification messages are received. In other embodiments, the alert modification application 130 may pre-select default classes of notification messages to filter for the user. Further, the classes of notification messages that the user would prefer to receive may also be ranked based on or categorized by an importance level to the user. For example, the user may strongly prefer that the alert modification application 130 categorize/filter notification messages based on a class of notification message that contains text that indicates a very high percentage off of a retail price (e.g. brand YY headphones 70% off). Each class of notification message, such as percentage savings, urgency, limited number of items, simple text, and the like, may be ranked by the user based on how important each class, type, and/or category of notification message is to the user. Alternatively, the analytics module 132 may apply an equal weight as a default to each different class of notification message.

Embodiments of the computing system 120 may also include a determining module 133. Embodiments of the determining module 133 may include one or more components of hardware and/or software program code for determining an alert preference corresponding to the class of notification message. For instance, embodiments of the determining module 133 may, in response to the analyzing the content payload of the notification to determine the class of message, determine which alert preference should be used to alert the user. Embodiments of an alert preference may refer to the manner in which the user is notified that an incoming push notification or similar notification has been received. Each class of message may be assigned a unique alert preference, so that the user is alerted to a notification message in accordance with a class of notification message. Embodiments of the alert preferences may range from little to no notification to the user, to slight notification, to moderate notification, to heavy notification and reminders to the user. The effectiveness of the alert may correspond to an importance level of the user that the user has placed on a particular class of notification message.

Embodiments of an alert or alert preference may include a short vibration, a long vibration, a short vibration and a ringtone, a long vibration and a ringtone, a silent notification, a flashing notification (e.g. notification banner flashing), a silent notification and a flashing notification, a tone, a color (e.g. color of banner background of notification message of a particular color), and a combination thereof. Further, alert preferences may involve a change in volume tone gradually increases, or starts at a higher volume level than a setting on the phone), a change in font size, a change in font style, such as bold, italics, and underlined font, a change in vibration strength and/or duration, a strobe effect using a light element on the user mobile device, a change in vibration frequency, and the like.

In an exemplary embodiment, the alert preference may be selected by the user to correspond to one or more classes of notification messages, prior to receiving the notification message. The alert modification application 130 may also alternatively have a default setting for alert preferences corresponding to a class, such as a type or category, of notification message. For example, the user may interact with the user mobile device GUI of alert modification application 130 to enter which alerts the user would prefer to receive for a particular type of notification message received. Accordingly, the determining module 133 may access the user settings or default settings related to alert preferences for a particular class of notification message, to determine the alert preference to use in response to receiving a notification message.

Figure 2:
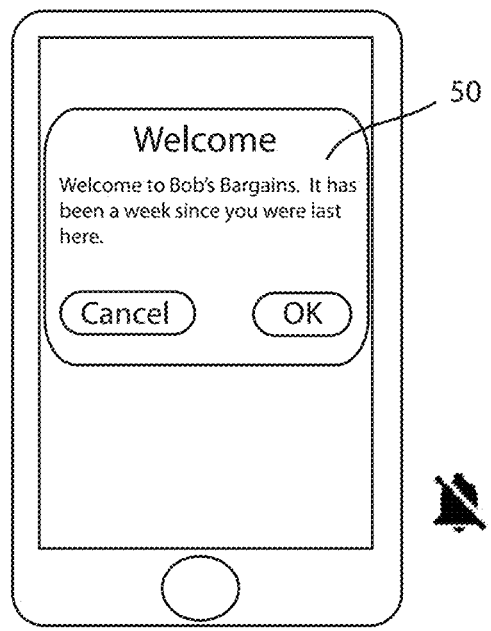
FIG. 2 depicts a first class of notification message along with a pictorial representation of a corresponding alert preference, in accordance with embodiments of the present invention.

Turning now to FIGS. 2-8 which depict example alert preferences based on a corresponding class of notification message received. FIG. 2 depicts a first type of notification message 50 along with a pictorial representation of a corresponding alert preference, in accordance with embodiments of the present invention. Here, the notification message 50 elicits no notification to the user (depicted as an alarm bell having a ling through the alarm bell). The analytics module 132 has analyzed the content of the notification message 50 shown in FIG. 2 to determine that the class of message is a generic welcome message that indicates a time since the user has last visited the location. The determining module 133 has determined that the user's alert preference for this type of message is a silent notification, or no notification beyond appearing as a banner on a screen of the user's mobile device.

Figure 3:
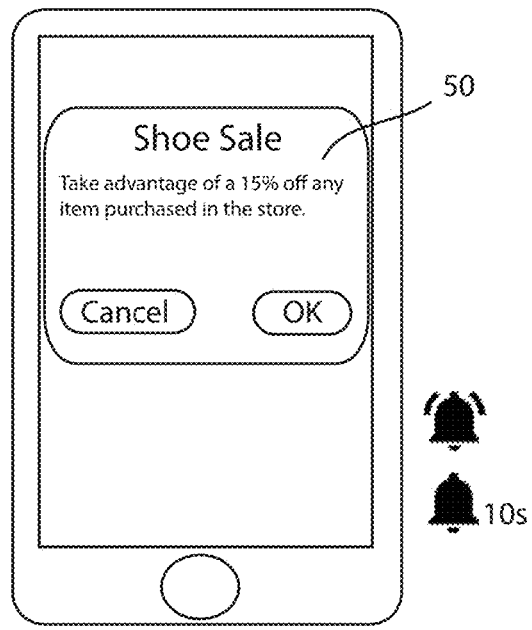
FIG. 3 depicts a second class of notification message along with a pictorial representation of a corresponding alert preference, in accordance with embodiments of the present invention.

FIG. 3 depicts a second class of notification message along with a pictorial representation of a corresponding alert preference, in accordance with embodiments of the present invention. Here, the notification message 50 elicits an audible tone for ten seconds in combination with a short vibration (depicted as a single alarm bell and 10 s, along with a single alarm bell having vibration effect). The analytics module 132 has analyzed the content of the notification message 50 shown in FIG. 3 to determine that the class of message is a sale with at least 15% off any item in the store, which may be within a first range of percentages associated with a type of notification. The determining module 133 has determined that the user's alert preference for this class of message is an audible tone for ten seconds in combination with a short vibration, in addition to appearing as a banner on a screen of the user's mobile device.

Figure 4:
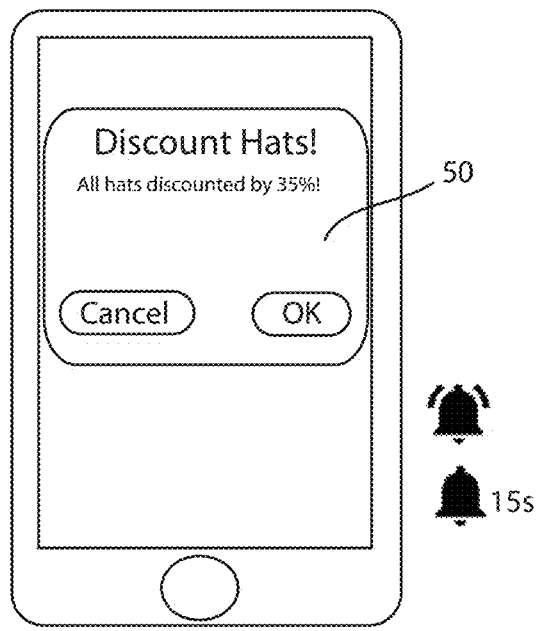
FIG. 4 depicts a third class of notification message along with a pictorial representation of a corresponding alert preference, in accordance with embodiments of the present invention.

FIG. 4 depicts a third class of notification message along with a pictorial representation of a corresponding alert preference, in accordance with embodiments of the present invention. Here, the notification message 50 elicits an audible tone for fifteen seconds in combination with a short vibration (depicted as a single alarm bell and 15 s, along with a single alarm bell having vibration effect). The analytics module 132 has analyzed the content of the notification message 50 shown in FIG. 4 to determine that the class of message is a sale with at least 35% off any item in the store, which may be within a second range of percentages associated with a different type of notification than shown in FIG. 3. The determining module 133 has determined that the user's alert preference for this class of message is an audible tone for fifteen seconds in combination with a short vibration, in addition to appearing as a banner on a screen of the user's mobile device.

Figure 5:
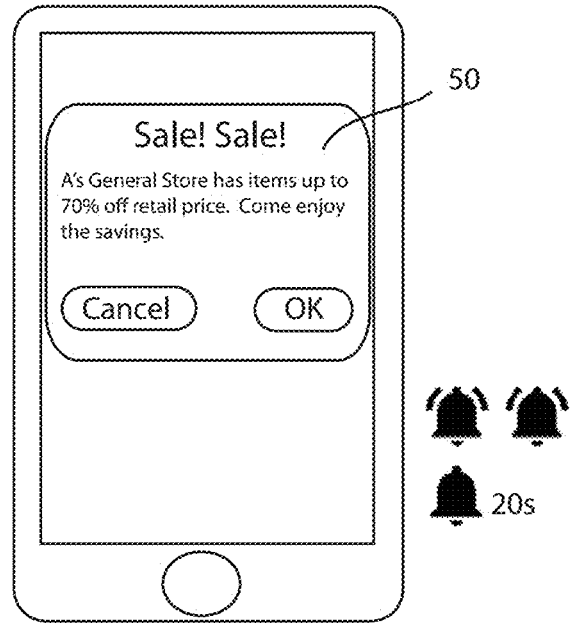
FIG. 5 depicts a fourth class of notification message along with a pictorial representation of a corresponding alert preference, in accordance with embodiments of the present invention.

FIG. 5 depicts a fourth class of notification message along with a pictorial representation of a corresponding alert preference, in accordance with embodiments of the present invention. Here, the notification message 50 elicits an audible tone for twenty seconds in combination with a long vibration (depicted as a single alarm bell and 20 s, along with a two alarm bells having vibration effect). The analytics module 132 has analyzed the content of the notification message 50 shown in FIG. 5 to determine that the class of message is a sale with at least 70% off any item in the store, which may be within a third range of percentages associated with a different type of notification than shown in FIGS. 3 and 4. The determining module 133 has determined that the user's alert preference for this class of message is an audible tone for twenty seconds in combination with a long vibration, in addition to appearing as a banner on screen of the user's mobile device.

Figure 6:
FIG. 6 depicts a fifth class of notification message along with a pictorial representation of a corresponding alert preference, in accordance with embodiments of the present invention.

FIG. 6 depicts a fifth class of notification message along with a pictorial representation of a corresponding alert preference, in accordance with embodiments of the present invention. Here, the notification message 50 elicits an audible tone for twenty seconds that changes in volume (e.g. increases volume over 20 seconds, goes up and down over 20 second, etc.) In combination with a short vibration that gradually increases vibration intensity, and a flashing banner (depicted as a single alarm bell and 20 s and a "volume up" icon, along with a single alarm bell having vibration effect with bars with gradually increasing height, and a "lightning bolt" icon to pictorially represent flashing). The analytics module 132 has analyzed the content of the notification message 50 shown in FIG. 6 to determine that the class of message is a time dependent or urgent promotion/message, which may be associated with a different class of notification than shown in FIGS. 3-5. The determining module 133 has determined that the user's alert preference for this class of message is an audible tone for twenty seconds that changes volume during the twenty seconds, in combination with a short vibration with increasing intensity, in addition to the banner flashing on a screen of the user's mobile device. In addition, the alert preference associated with this class of notification message 50 further includes a command to repeat this alert until acknowledged by the user (depicted as a circular arrow). The repeat may occur at a certain interval after the original notification, or may continuously repeat until the user acknowledges the notification message 50 by interacting with the mobile device.

Figure 7:
FIG. 7 depicts a sixth class of notification message along with a pictorial representation of a corresponding alert preference, in accordance with embodiments of the present invention.

FIG. 7 depicts a sixth class of notification message along with a pictorial representation of a corresponding alert preference, in accordance with embodiments of the present invention. Here, the notification message 50 elicits an audible tone for ten seconds in combination with a short vibration, and a specific color coded banner (depicted as a single alarm bell and 10 s, along with a single alarm bell having vibration effect, and "blue"). The analytics module 132 has analyzed the content of the notification message 50 shown in FIG. 7 to determine that the class of message is a promotion/message relating to a specific good or service (e.g. golf accessories), which may be associated with a different class of notification than shown in FIGS. 3-6. The determining module 133 has determined that the user's alert preference for this class of message is an audible tone for ten seconds, in combination with a short vibration, in addition to the banner being a unique blue color on a screen of the user's mobile device. In addition, the alert preference associated with this class of notification message 50 further includes a command to repeat this alert until acknowledged by the user (depicted as a circular arrow). The repeat may occur at certain interval after the original notification, or may continuously repeat until the user acknowledges the notification message 50 by interacting with the mobile device.

Figure 8:
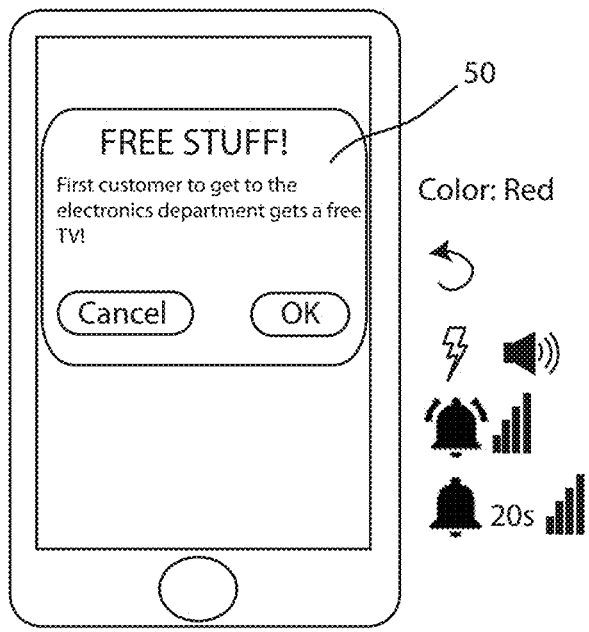
FIG. 8 depicts a seventh class of notification message along with a pictorial representation of a corresponding alert preference, in accordance with embodiments of the present invention.

FIG. 8 depicts a seventh class of notification message along with a pictorial representation of a corresponding alert preference, in accordance with embodiments of the present invention. Here, the notification message 50 elicits an audible tone for twenty seconds that changes in volume (e.g. increases volume over 20 seconds, goes up and down over 20 second, etc.) in combination with a short vibration that gradually increases vibration intensity, and a color coded flashing banner (depicted as a single alarm bell and 20 s and a "volume up" icon, along with a single alarm bell having vibration effect with bars with gradually increasing height, a "lightning bolt" icon to pictorially represent flashing, and "red"). The analytics module 132 has analyzed the content of the notification message 50 shown in FIG. 8 to determine that the class of message is both a time dependent or urgent promotion/message and a great deal, which may be associated with a different type of notification than shown in FIGS. 3-7. The determining module 133 has determined that the user's alert preference for this class of message is an audible tone for twenty seconds that changes volume during the twenty seconds, in combination with a short vibration with increasing intensity, in addition to a red colored banner flashing on a screen of the user's mobile device. In addition, the alert preference associated with this class of notification message 50 further includes a command to repeat this alert until acknowledged by the user (depicted as a circular arrow). The repeat may occur at a certain interval after the original notification, or may continuously repeat until the user acknowledges the notification message 50 by interacting with the mobile device.

Referring back to FIG. 1, embodiments of the computing system 120 may include an alerting module 134. Embodiments of the alerting module 134 may include one or more components of hardware and/or software program code for alerting the user of the notification message in accordance with the alert preference. For instance, embodiments of the alerting module 134 may notify or otherwise alert the user to the notification using a specific, custom alert based on a class of notification. By alerting the user with a specific alert preference, the user may then know the class of notification from sensory, audible, haptic, etc. feedback, and can decide whether it is worth the user's time to check the notification and carefully examine the notification, especially in situations where the user is inundated with notifications from various sources. In an exemplary embodiment, the alerting module 134 may display the notification on a screen of the user's mobile device, along with a perceptible sensory action, including a tone, a sound, a vibration, an emission of light, a sporadic emission of light, etc. The alerting module 134 may instruct various hardware functionalities to perform various tasks to implement the alert preference associated with the class of notification. For example, the alerting module 134 may instruct the mobile device hardware, such as a light element, a display, a vibration motor, a speaker, associated software, and the like.

Various tasks and specific functions of the modules of the computing system 120 may be performed by additional modules, or may be combined into other module(s) to reduce the number of modules. Further, embodiments of the computer or computer system 120 may comprise specialized, non-generic hardware and circuitry (i.e., specialized discrete non-generic analog, digital, and logic-based circuitry) (independently or in combination) particularized for executing only methods of the present invention. The specialized discrete non-generic analog, digital, and logic-based circuitry may include proprietary specially designed components (e.g., a specialized integrated circuit, such as for example an Application Specific Integrated Circuit (ASIC), designed for only implementing methods of the present invention). Moreover, embodiments of the alert system 100 may improve beacon and push notification technology by offering a method to filter push notifications received from beacons based on a type of message. Thus, the alert system 100 may be individualized to each user/user device, which is being used to filter push notifications based on a type of push notification, by analyzing the content of the push notification and using device hardware to notify the user based on each device settings for alert preferences.

Furthermore, the alert system 100 improves computer technology by saving computing power resources. Issuing an alert to the user uses power and other computing resources of a mobile device. Additional power is also used if the user activates the device from a rest state with the screen turned off to an active state to check the alert. The claimed solution is necessarily rooted in computer technology in order to overcome a problem specifically arising in the realm of computer technology. By reducing the number of alerts presented to the user using a specific set of rules, there is a savings in the computing resources used. For example, in the embodiment shown in FIG. 2 which depicts a generic welcome notification based on a geographic location, the alert modification application 130 does not use computing power to sound an alarm, cause the mobile to vibrate, etc., which may normally occur without the alert modification application 130. In other words, the alert modification application 130 may determine that a notification message 50 received by the user should be presented to the user in accordance with an alert preference that may consume less computing resources than if the notification message 50 was presented to the user in a traditional manner without analyzing the content payload of the notification message 50 and alerting the user according to the rules-based alert preferences). Thus, in some embodiments, there is an improvement to the computing device/systems overall, because the alert system 100 may be directed to an improvement to computer technology, including software that improves the capability of a computing device.

In further embodiments, the alert system 100 may improve the computing device based on a set of rules that use computing resources more efficiently. As shown in FIGS. 3-8, various alert preferences specifically communicate a class of notification to the user, so that the user can decide whether to further explore the contents of the notification message 50 (e.g. clicking on the notification message 50 which may initiate browser executable code that consumes computing power resources), or to ignore or silence the notification message 50 to save computing resources. While implementation of the alert preference may consume computing resources, the computing resources are consumed more efficiently because the user no longer needs to request the mobile device to consume additional computing resources in pursuit of content that the user ultimately will not be interested in. Even further, in some embodiments, the alert system 100 provides the ability to control a power usage of the mobile device by setting various alert preferences/rules based on analyzed content payloads of notification messages 50 received by the mobile device.

Figure 9:
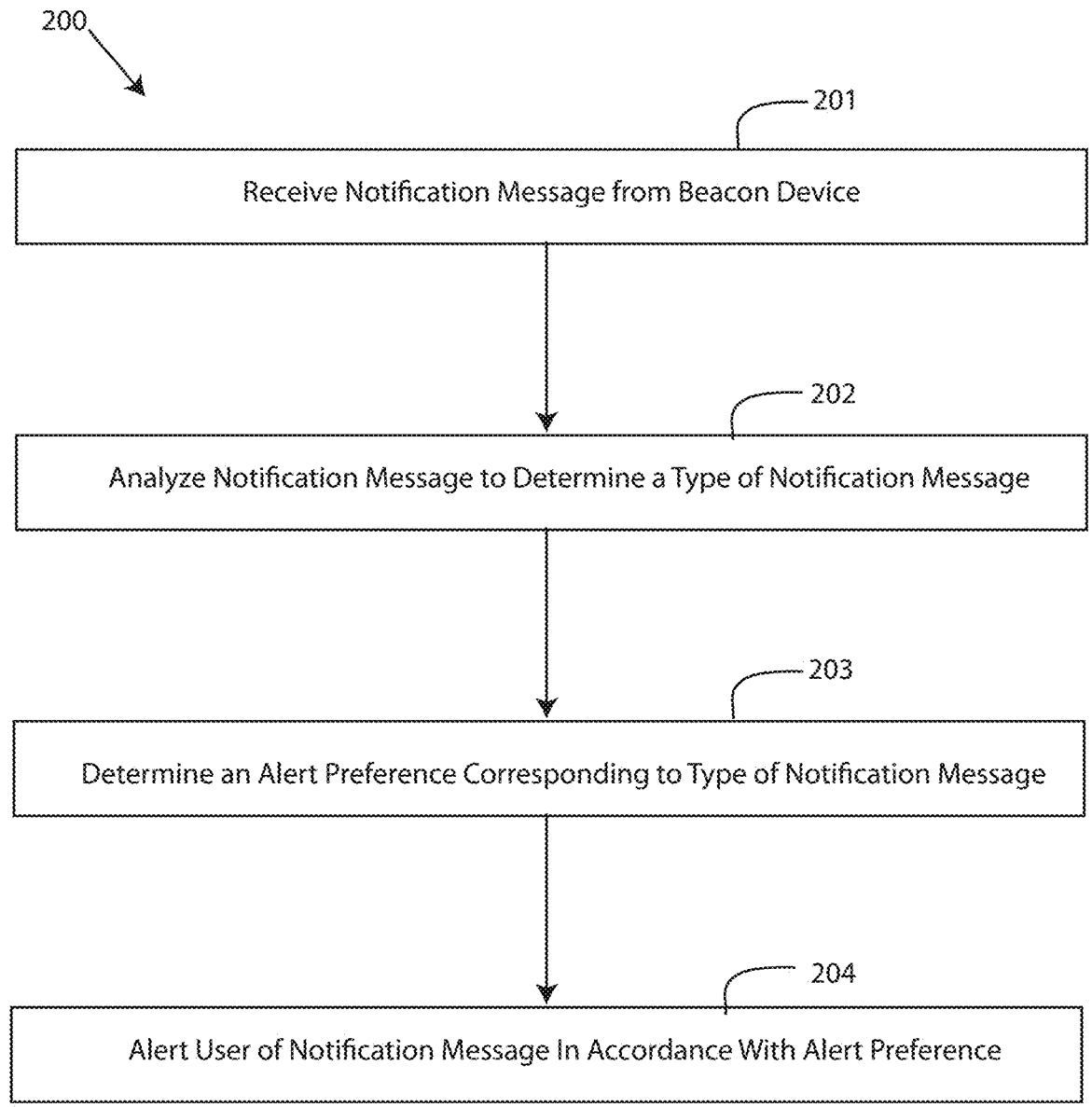
FIG. 9 depicts a flow chart of a method for alert modification based on the content of a notification, in accordance with embodiments of the present invention.

Referring now to FIG. 9, which depicts a flow chart of a method 200 for alert modification based on a content of a notification, in accordance with embodiments of the present invention. One embodiment of a method 200 or algorithm that may be implemented for alert modification based on a content of a notification with the alert system 100 described in FIGS. 1-8 using one or more computer systems as defined generically in FIG. 11 below, and more specifically by the specific embodiments of FIG. 1.

Embodiments of the method 200 for alert modification based on a content of a notification, in accordance with embodiments of the present invention, may begin at step 201 wherein a notification is received by the user mobile device from one or more notification source 110a, 110b, 110c . . . 110n. Step 202 analyzes the notification to determine a class of the notification message. Step 203 determines an alert preference corresponding to the class of notification message received. Step 204 then alerts the user of the notification message in accordance with the alert preference determined to correspond with the type of notification message received.

Figure 10:
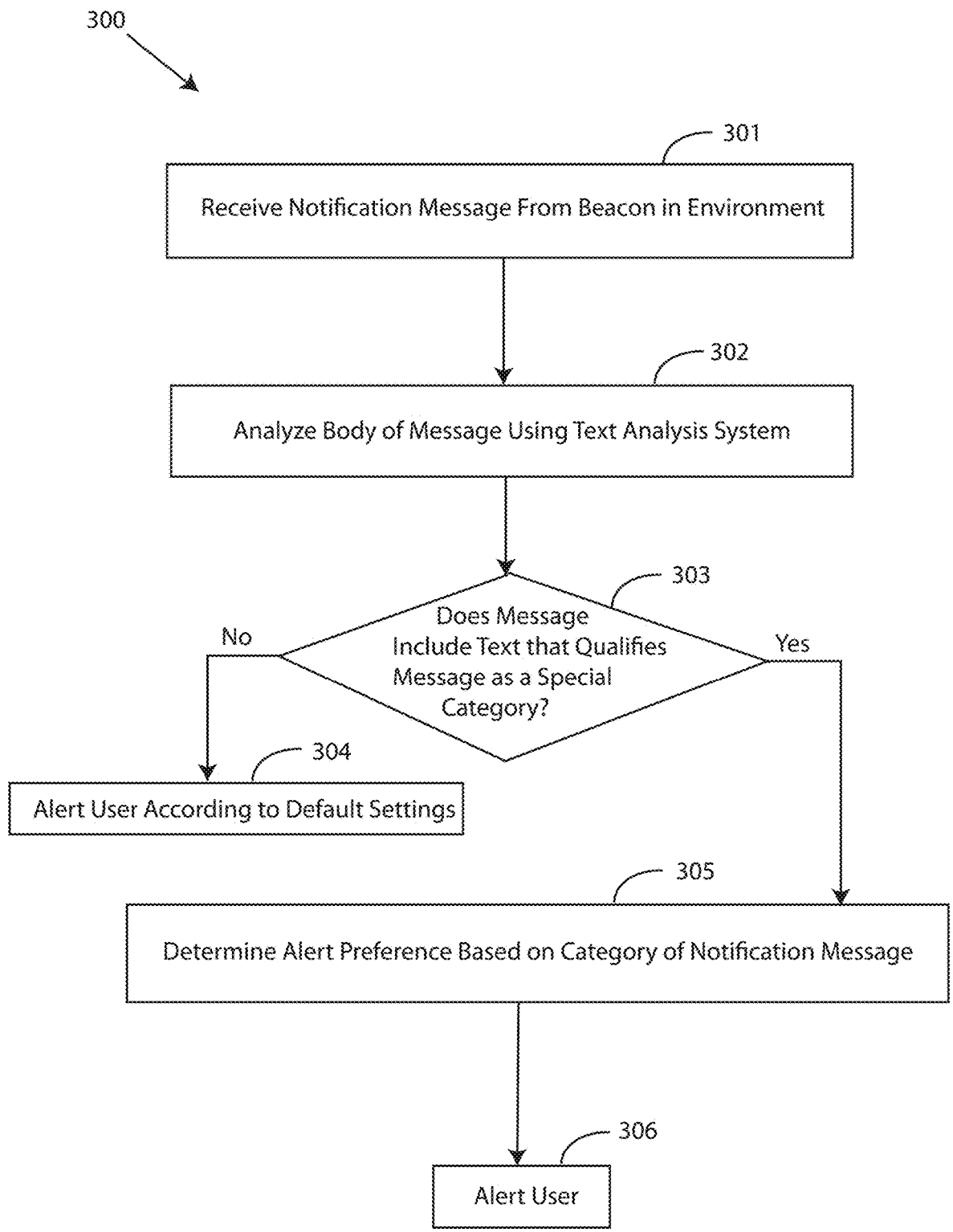
FIG. 10 depicts a detailed flow chart of a method for alert modification based on a content of a notification, in accordance with embodiments of the present invention.

FIG. 10 depicts a detailed flow chart of a method 300 for alert modification based on a content of a notification, in accordance with embodiments of the present invention. Embodiments of the method 300 for alert modification based on a content of a notification may begin at step 301, wherein the notification message is received from a device, such as a beacon device in an environment. Step 302 analyzes the body of the message using a text analysis system or natural language processing technique. Step 303 determines whether the notification message includes text that qualifies that notification method as a special category. If no, step 304 alerts user according to default settings, with no customized alert preference. If yes, step 305 determines the alert preference based on a class of notification message. Step 306 alerts the user accordingly.

Figure 11:
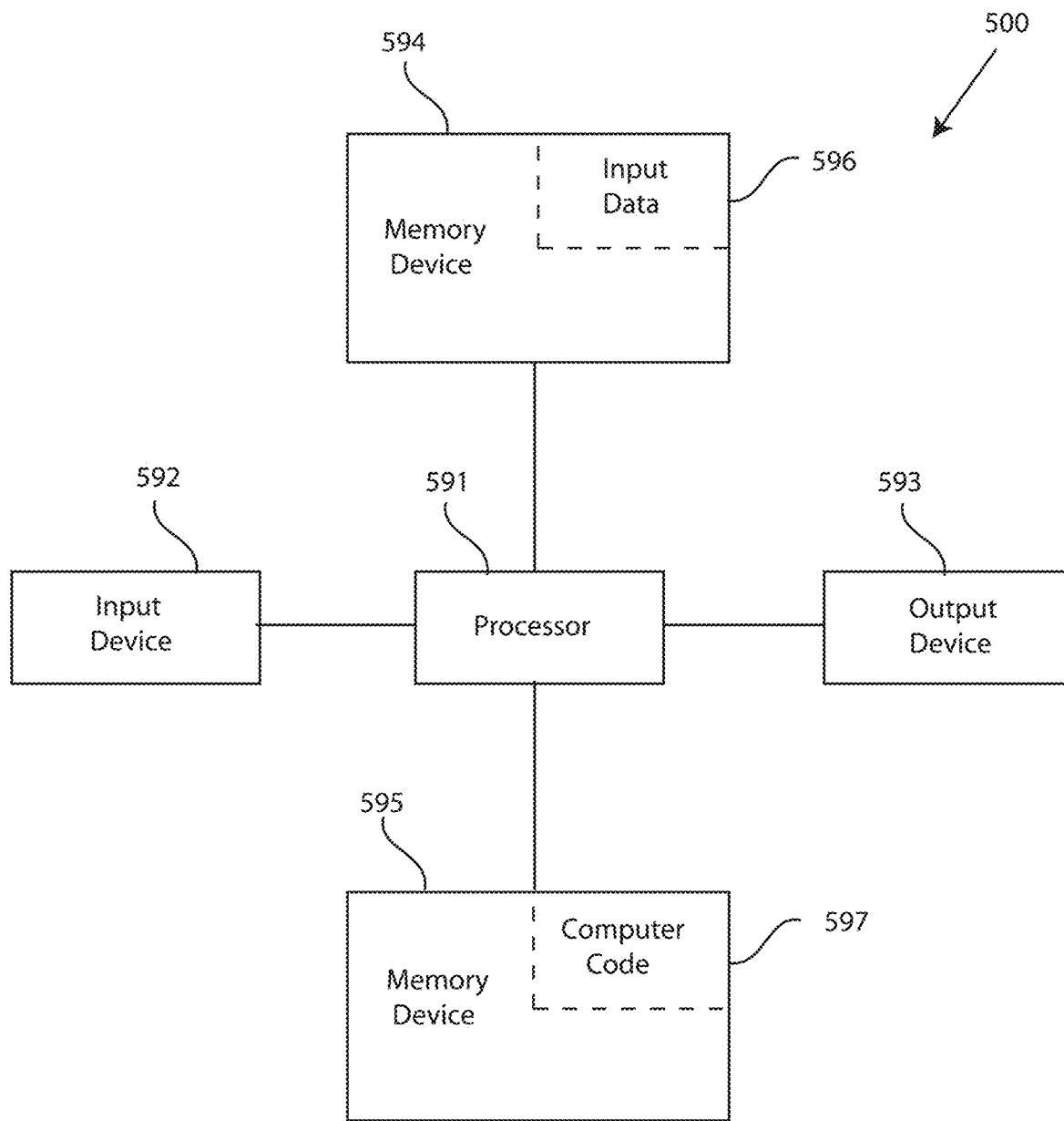
FIG. 11 depicts a block diagram of a computer system for the alert system of FIGS. 1-8, capable of implementing methods for alert modification based on a content of a notification of FIGS. 9-10, in accordance with embodiments of the present invention.

FIG. 11 depicts a block diagram of a computer system for the alert system 100 of FIGS. 1-8, capable of implementing methods for alert modification based on a content of a notification of FIGS. 9-10, in accordance with embodiments of the present invention. The computer system 500 may generally comprise a processor 591, an input device 592 coupled to the processor 591, an output device 593 coupled to the processor 591, and memory devices 594 and 595 each coupled to the processor 591. The input device 592, output device 593 and memory devices 594, 595 may each be coupled to the processor 591 via a bus. Processor 591 may perform computations and control the functions of computer system 500, including executing instructions included in the computer code 597 for the tools and programs capable of implementing a method for alert modification based on a content of a notification in the manner prescribed by the embodiments of FIGS. 9-10 using the alert system 100 of FIGS. 1-8, wherein the instructions of the computer code 597 may be executed by processor 591 via memory device 595. The computer code 597 may include software or program instructions that may implement one or more algorithms for implementing the method for alert modification based on a content of a notification, as described in detail above. The processor 591 executes the computer code 597. Processor 591 may include a single processing unit, or may be distributed across one or more processing units in one or more locations (e.g., on a client and server).

The memory device 594 may include input data 596. The input data 596 includes any inputs required by the computer code 597. The output device 593 displays output from the computer code 597. Either or both memory devices 594 and 595 may be used as a computer usable storage medium (or program storage device) having a computer-readable program embodied therein and/or having other data stored therein, wherein the computer-readable program comprises the computer code 597. Generally, a computer program product (or, alternatively, an article of manufacture) of the computer system 500 may comprise said computer usable storage medium (or said program storage device).

Memory devices 594, 595 include any known computer-readable storage medium, including those described in detail below. In one embodiment, cache memory elements of memory devices 594, 595 may provide temporary storage of at least some program code computer code 597) in order to reduce the number of times code must be retrieved from bulk storage while instructions of the computer code 597 are executed. Moreover, similar to processor 591, memory devices 594, 595 may reside at a single physical location, including one or more types of data storage, or be distributed across a plurality of physical systems in various forms. Further, memory devices 594, 595 can include data distributed across, for example, a local area network (LAN) or a wide area network (WAN). Further, memory devices 594, 595 may include an operating system (not shown) and may include other systems not shown in FIG. 11.

In some embodiments, the computer system 500 may further be coupled to an Input/output (I/O) interface and a computer data storage unit. An I/O interface may include any system for exchanging information to or from an input device 592 or output device 593. The input device 592 may be, inter alia, a keyboard, a mouse, etc. or in some embodiments the touchscreen of a computing device. The output device 593 may be, inter alia, a printer, a plotter, a display device (such as a computer screen), a magnetic tape, a removable hard disk, a floppy disk, etc. The memory devices 594 and 595 may be, inter alia, a hard disk, a floppy disk, a magnetic tape, an optical storage such as a compact disc (CD) or a digital video disc (DVD), a dynamic random access memory (DRAM), a read-only memory (ROM), etc. The bus may provide a communication link between each of the components in computer 500, and may include any type of transmission link, including electrical, optical, wireless, etc.

An I/O interface may allow computer system 500 to store information (e.g., data or program instructions such as program code 597) on and retrieve the information from computer data storage unit (not shown). Computer data storage unit includes a known computer-readable storage medium, which is described below. In one embodiment, computer data storage unit may be a non-volatile data storage device, such as a magnetic disk drive (i.e., hard disk drive) or an optical disc drive (e.g., a CD-ROM drive which receives a CD-ROM disk). In other embodiments, the data storage unit may include a knowledge base or data repository 125 as shown in FIG. 1.

As will be appreciated by one skilled in the art, in a first embodiment, the present invention may be a method; in a second embodiment, the present invention may be a system; and in a third embodiment, the present invention may be a computer program product. Any of the components of the embodiments of the present invention can be deployed, managed, serviced, etc. by a service provider that offers to deploy or integrate computing infrastructure with respect to alert modification systems and methods. Thus, an embodiment of the present invention discloses a process for supporting computer infrastructure, where the process includes providing at least one support service for at least one of integrating, hosting, maintaining and deploying computer-readable code (e.g., program code 597) in a computer system (e.g., computer system 500) including one or more processor(s) 591, wherein the processor(s) carry out instructions contained in the computer code 597 causing the computer system to modify alerts based on a type of notification. Another embodiment discloses a process for supporting computer infrastructure, where the process includes integrating computer-readable program code into a computer system 500 including a processor.

The step of integrating includes storing the program code in a computer-readable storage device of the computer system 500 through use of the processor. The program code, upon being executed by the processor, implements a method for alert modification based on a content of a notification. Thus, the present invention discloses a process for supporting, deploying and/or integrating computer infrastructure, integrating, hosting, maintaining, and deploying computer-readable code into the computer system 500, wherein the code in combination with the computer system 500 is capable of performing a method for alert modification based on a content of a notification.

A computer program product of the present invention comprises one or more computer-readable hardware storage devices having computer-readable program code stored therein, said program code containing instructions executable by one or more processors of a computer system to implement the methods of the present invention.

A computer system of the present invention comprises one or more processors, one or more memories, and one or more computer-readable hardware storage devices, said one or more hardware storage devices containing program code executable by the one or more processors via the one or more memories to implement the methods of the present invention.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 12:
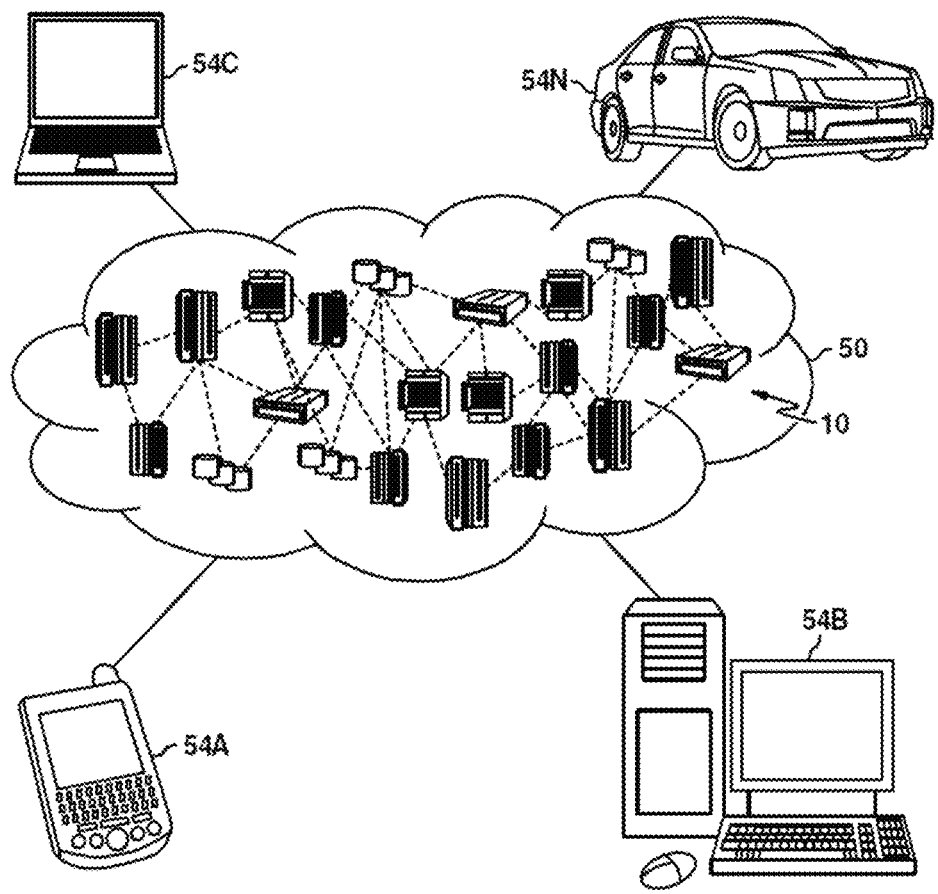
FIG. 12 depicts a cloud computing environment, in accordance with embodiments of the present invention.

Referring now to FIG. 12, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 12 are intended to be illustrative only and that computing nodes 10 and cloud computing environment 50 can communicate with any type of computerized device over any type of network and/or network addressable connection (e.g., using a web browser).

Figure 13:
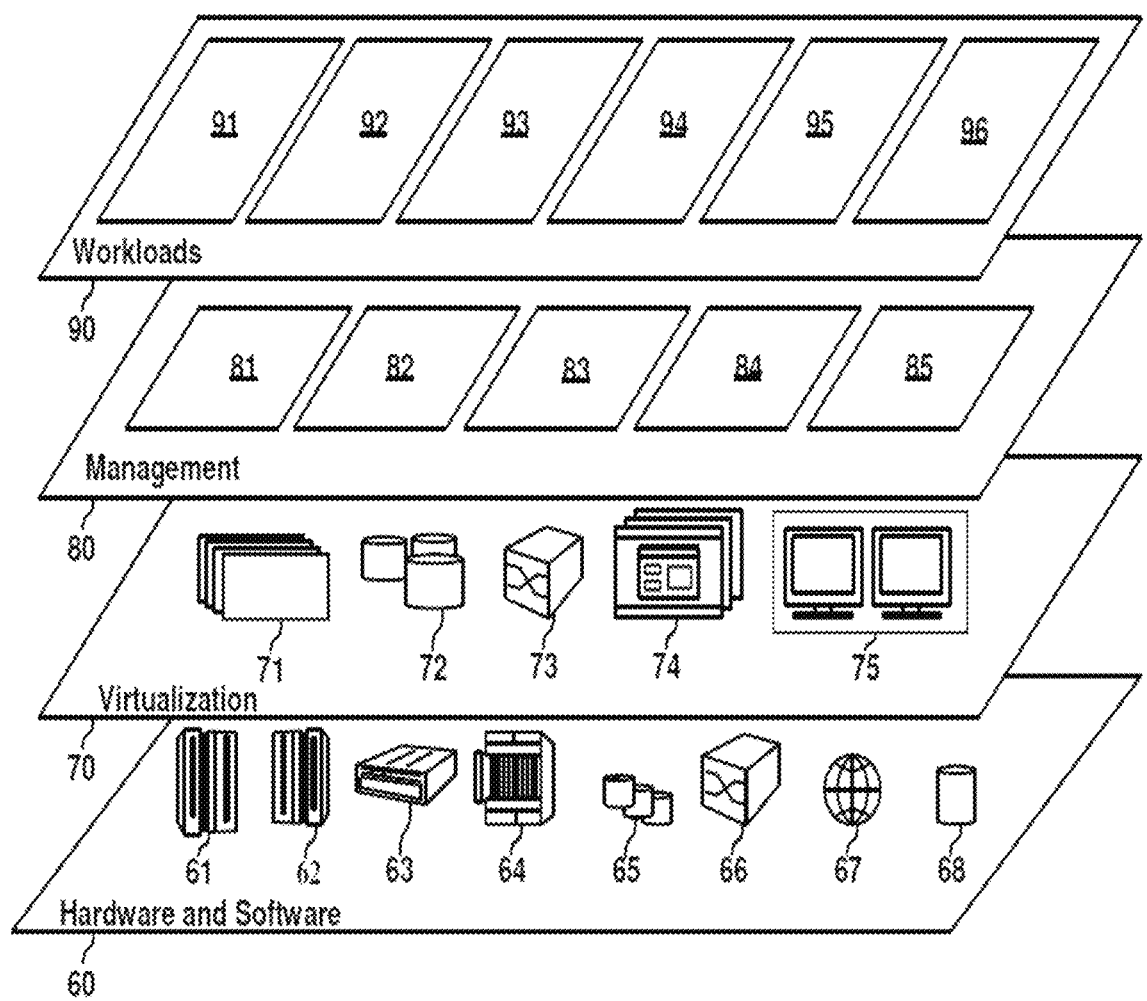
FIG. 13 depicts abstraction model layers, in accordance with embodiments of the present invention.

Referring now to FIG. 13, a set of functional abstraction layers provided by cloud computing environment 50 (see FIG. 12) are shown. It should be understood in advance that the components, layers, and functions shown in FIG. 13 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and alert modification 96.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for alert modification based on a content of a notification, the method comprising:
    receiving, by a processor of a computing system, a notification message from a beacon device arranged in an environment, wherein a sending of the notification message is prompted by a location of a user;
    analyzing, by the processor, a content payload of the notification message to determine that a class of the notification message matches a pre-selected message class, the pre-selected message class being input by the user prior to receiving the notification message, wherein the pre-selected message class is a category of promotional notification messages selected from the group consisting of: a first percentage off of a sale price and a time dependent offer;
    determining, by the processor, an alert preference that corresponds to the category of promotional notification messages of the pre-selected message class matching the class of the notification message, the alert preference being input by the user prior to receiving the notification message according to an importance level of the category of promotional message to the user, wherein the alert preference is selected from a plurality of alert preferences that are each associated with different categories of promotional notification messages; and
    alerting, by the processor, the user of the notification message in accordance with the alert preference.

2. The method of claim 1, wherein the alert preference has a varying time duration, and is selected from the group consisting of: a short vibration, a long vibration, the short vibration and a ringtone, the long vibration and the ringtone, a silent notification, a flashing notification, the silent notification and the flashing notification, a tone, a color, and a combination thereof.

3. The method of claim 1, wherein the alert preference includes a change in volume, a change in font size, a change in font style, such as bold, italics, and underlined font, a change in vibration.

4. The method of claim 1, wherein the analyzing includes examining a text of the notification message to determine the class of notification message.

5. The method of claim 1, further comprising: repeating, by the processor, the alerting of the notification message when the type of notification message exceeds a threshold of the importance level of the user.

6. A computer system, comprising:
    a processor;
    a memory device coupled to the processor; and
    a computer readable storage device coupled to the processor, wherein the storage device contains program code executable by the processor via the memory device to implement a method for alert modification based on a content of a notification, the method comprising:
        receiving, by a processor of a computing system, a notification message from a beacon device arranged in an environment, wherein a sending of the notification message is prompted by a location of a user;
        analyzing, by the processor, a content payload of the notification message to determine that a class of the notification message matches a pre-selected message class, the pre-selected message class being input by the user prior to receiving the notification message, wherein the pre-selected message class is a category of promotional notification messages selected from the group consisting of: a percentage off of a sale price and a time dependent offer;
        determining, by the processor, an alert preference that corresponds to the category of promotional notification messages of the pre-selected message class matching the class of the notification message, the alert preference being input by the user prior to receiving the notification message according to an importance level of the category of promotional message to the user, wherein the alert preference is selected from a plurality of alert preferences that are each associated with different categories of promotional notification messages; and
        alerting, by the processor, the user of the notification message in accordance with the alert preference.

7. The computer system of claim 6, wherein the alert preference has a varying time duration, and is selected from the group consisting of: a short vibration, a long vibration, the short vibration and a ringtone, the long vibration and the ringtone, a silent notification, a flashing notification, the silent notification and the flashing notification, a tone, a color, and a combination thereof.

8. The computer system of claim 6, wherein the alert preference includes a change in volume, a change in font size, a change in font style, such as hold, italics, and underlined font, a change in vibration.

9. The computer system of claim 6, wherein the analyzing includes examining a text of the notification message to determine the class of notification message.

10. The computer system of claim 6, further comprising: repeating, by the processor, the alerting of the notification message when the type of notification message exceeds a threshold of the importance level of the user.

11. A computer program product, comprising a computer readable hardware storage device storing a computer readable program code, the computer readable program code comprising an algorithm that when executed by a computer processor of a computing system implements a method for alert modification based on a content of a notification, the method comprising:

receiving, by a processor of a computing system, a notification message from a beacon device arranged in an environment, wherein a sending of the notification message is prompted by a location of a user;

analyzing, by the processor, a content payload of the notification message to determine that a class of the notification message matches a pre-selected message class, the pre-selected message class being input by the user prior to receiving the notification message, wherein the pre-selected message class is a category of promotional notification messages selected from the group consisting of: a first percentage off of a sale price and a time dependent offer;

determining, by the processor, an alert preference, that corresponds to the category of promotional notification messages of the pre-selected message class matching the class of the notification message, the alert preference being input by the user prior to receiving the notification message according to an importance level of the category of promotional message to the user, wherein the alert preference is selected from a plurality of alert preferences that are each associated with different categories of promotional notification messages; and alerting, by the processor, the user of the notification message in accordance with the alert preference.

12. The computer program product of claim 11, wherein the alert preference has a varying time duration, and is selected from the group consisting of: a short vibration, a long vibration, the short vibration and a ringtone, the long vibration and the ringtone, a silent notification, a flashing notification, the silent notification and the flashing notification, a tone, a color, and a combination thereof.

13. The computer program product of claim 11, wherein the alert preference includes a change in volume, a change in font size, a change in font style, such as bold, italics, and underlined font, a change in vibration.

14. The computer program product of claim 11, wherein the analyzing includes examining a text of the notification message to determine the class of notification message.

* * * * *